United States Patent

Becker et al.

[11] Patent Number: 5,979,922
[45] Date of Patent: Nov. 9, 1999

[54] BICYCLE HAVING NOVEL DRIVE AND STEERING MECHANISMS

[76] Inventors: John L. Becker, 3886 River Bend Dr., SW., Grand Rapids, Mich. 49544; Gary J. Becker, 3989 Prairie, SW.; David J. Becker, 3341 Fayette, SW., both of Grandville, Mich. 49418

[21] Appl. No.: 08/848,587

[22] Filed: Apr. 28, 1997

[51] Int. Cl.⁶ .................................................. B62M 1/04
[52] U.S. Cl. ........................ 280/252; 280/241; 280/288.1
[58] Field of Search ................................ 280/288.1, 251, 280/252, 241

[56] References Cited

U.S. PATENT DOCUMENTS

| | | |
|---|---|---|
| 556,802 | 3/1896 | Boyle . |
| 566,838 | 9/1896 | Boyle . |
| 651,316 | 6/1900 | Smith . |
| 1,575,786 | 3/1926 | Parr .......................................... 280/251 |
| 1,653,889 | 12/1927 | Clark ........................................ 280/251 |
| 3,588,144 | 6/1971 | Padial ...................................... 280/252 |
| 3,891,235 | 6/1975 | Shelly . |
| 4,169,609 | 10/1979 | Zampedro . |
| 4,283,070 | 8/1981 | Forrestall et al. . |
| 4,592,563 | 6/1986 | Dean et al. . |
| 4,838,568 | 6/1989 | Arroyo . |
| 4,878,684 | 11/1989 | Lemle .................................. 280/288.1 |
| 4,928,986 | 5/1990 | Carpenter . |
| 5,044,627 | 9/1991 | Huang . |
| 5,069,469 | 12/1991 | Rosengrant et al. ................. 280/288.1 |
| 5,125,677 | 6/1992 | Ogilvie et al. ........................... 280/252 |
| 5,156,412 | 10/1992 | Meguerditchian . |
| 5,236,211 | 8/1993 | Meguerditchian . |
| 5,242,181 | 9/1993 | Fales et al. . |
| 5,272,928 | 12/1993 | Young . |
| 5,290,054 | 3/1994 | Po . |
| 5,388,847 | 2/1995 | Trammell, Jr. . |
| 5,496,051 | 3/1996 | Farmos . |
| 5,607,171 | 3/1997 | Labranche ............................ 280/288.1 |
| 5,690,346 | 11/1997 | Keskitalo ................................ 280/252 |

FOREIGN PATENT DOCUMENTS

| | | |
|---|---|---|
| 812100 | 4/1936 | France . |
| 802435 | 9/1936 | France . |
| 811916 | 4/1937 | France . |
| 2455540 | 1/1981 | France . |
| 2583369 | 12/1986 | France . |
| 2142137 | 3/1973 | Germany . |
| 1221025 | 3/1986 | Russian Federation . |
| 1335496 | 9/1987 | Russian Federation ............... 280/252 |
| 1512848 | 10/1989 | Russian Federation ........... 280/288.1 |
| 1722935 A1 | 3/1992 | Russian Federation . |
| 1754561 A1 | 8/1992 | Russian Federation ........... 280/288.1 |
| 667140 A5 | 9/1988 | Switzerland . |
| 7331 | 4/1899 | United Kingdom . |
| 875366 | 8/1961 | United Kingdom . |
| 1180212 | 2/1970 | United Kingdom ................... 280/252 |

OTHER PUBLICATIONS

Corsa Recumbent Tricycle (1 page), Manufactured by H.P.E. Corporation, Seattle, Washington, Article in Playboy Magazine, Jul. 1987.

Linear Sales Brochure, (2 pages), from Linear Manufacturing Incorporated, Guttenberg, Iowa.

*Primary Examiner*—Lanna Mai
*Assistant Examiner*—Avraham H. Lerner
*Attorney, Agent, or Firm*—Price, Heneveld, Cooper, DeWitt & Litton

[57] ABSTRACT

A bicycle includes a frame having front and rear sections. The frame includes a pair of guides that are disposed in a parallel relationship and carry a portion of the load generated by a seated rider. The guides define therebetween a pedal drive path that extends parallel to the guides. A rear wheel is rotatably mounted to the frame adjacent the rear section. An elongate flexible connector forms a loop. A seat is mounted to the frame for support of a rider. A drive mechanism is connected to the frame and includes a pair of pedals that are operably attached to the rear wheel by the flexible connector for powered rotation of the rear wheel. The pedals are slidably supported and guided between the guides for motion along the pedal drive path between an extended position and a retracted position.

23 Claims, 5 Drawing Sheets

BICYCLE HAVING NOVEL DRIVE AND STEERING MECHANISMS

BACKGROUND OF THE INVENTION

The present invention relates to a human-powered reclining bicycle, and in particular to a recumbent bicycle having pedals supported and guided by structural frame members to drive a single drive chain, and a novel steering mechanism.

Various bicycle drive systems and rider positions have been proposed in an effort to provide a rider position that is comfortable and maximizes the utilization of the rider's leg force. For example, rectilinear pedal drive systems having two drive chains and an upright rider position have been proposed. This drive system has a separate structure mounted to an existing bicycle frame for supporting and guiding the pedals, and is vertically-oriented for operation when in an upright riding position. Some recumbent human-powered apparatus have been proposed with drive systems having pivotally mounted pedals movable along an arcuate motion. Several prior pedal drive systems utilize interconnected pedals that allow only alternating pedal motion. Other pedal drive systems have both pedals attached to a single, rigid frame such that both pedals move forward and rearward together. These systems do not have enough flexibility to allow independent pedal motion wherein the rider chooses simultaneous or alternating pedal motion nor are they adapted for riding by a rider having only limited use of one leg. In addition, prior recumbent bicycle designs have a frame that includes two or more tube members in a vertically spaced-apart relationship extending substantially the entire length of the frame. Since the seat is mounted on top of the upper tube, this results in a relatively high rider position and center of gravity. Therefore, a device solving the aforementioned problems is desired.

SUMMARY OF THE INVENTION

One aspect of the present invention is to provide a bicycle having a frame with a front section and a rear section, wherein the frame includes a pair of guides disposed in a parallel relationship. Each of the guides carries a portion of the load generated by a seated rider. The guides define therebetween a pedal drive path extending parallel to the structural members. The bicycle also includes a rear wheel rotatably mounted to the frame adjacent the rear section. A seat is mounted to the frame to support a rider. The bicycle further includes a drive mechanism connected to the frame including an elongate flexible connector forming a loop. A pair of pedals are operably attached to the rear wheel by the elongate flexible connector for powered rotation of the rear wheel. The pedals are slidably supported and guided between the guides for motion along the pedal drive path between an extended position and a retracted position.

Another aspect of the present invention is to provide a bicycle having a frame defining a front section and a rear section and including structural frame members. Each of the structural frame members carries a portion of the load generated by a rider during operation. A front wheel is rotatably operably mounted to the frame adjacent the front section. A rear wheel is rotatably mounted to the frame adjacent the rear section. A seat that is adapted to comfortably support a rider in a recumbent riding position is mounted to the frame. A horizontal guide is also attached to the frame. A drive chain forming an elongated loop is operably connected to a pair of pedals. The pedals have foot supports and are slidably supported on the guide for horizontal motion therealong. One of the pedals includes a first unidirectional drive sprocket that engages the drive chain. The other pedal has an elongate drive extension that includes a forward end and a rearward end. A second unidirectional drive sprocket is mounted adjacent the rearward end of the drive extension. The drive extension has sufficient length to provide clearance between the first and second unidirectional drive sprockets during alternating pedal motion.

Another aspect of the present invention is to provide a wheeled, manually driven rideable apparatus including a frame defining a pair of horizontally extending guides. The apparatus further includes a pair of pedals that are operably mounted on the guides for reciprocating movement. A seat on the frame is constructed to position a seated person in a position on the frame with the person's legs extending generally horizontally when the person's feet are engaging the pedals. Front and rear wheels are operably mounted on the frame. A drive mechanism operably connects the pedals to one of the front and rear wheels. The drive mechanism includes a one-way moving drive chain and unidirectional sprockets connecting the pedals independently to the drive chain so that the pedals can selectively be operated one at a time in an alternating pattern, or one at a time while holding the other pedal still, or simultaneously in a side-by-side manner.

Another aspect of the present invention is to provide a wheeled riding device including a low profile wheeled frame having a front section with a front bearing, and a midsection constructed to support a seated person, and a rear section. The midsection of the frame includes a large horizontal tube. The device includes at least one rear wheel operably supported by the rear section and a steerable front fork journaled to the front bearing. The device further includes a front wheel operably supported by the front fork. A steering mechanism is connected to the fork and has a longitudinal section that extends under the midsection from the front fork to the midsection. A pair of vertical sections are operably attached to the horizontal section. The vertical sections extend from under the midsection to a location generally above the midsection. Handles extend from upper ends of each vertical section so that a seated person can readily grasp the handles and steer the riding device.

The present invention provides, among other things, a recumbent bicycle having a rectilinear drive system with a single drive chain. The drive system allows either alternating or simultaneous pedal movement, and also allows operation by actuation of a single pedal. The pedals are guided by structural frame members with a cross-sectional shape that includes guide portions formed by a pair of arcuate protrusions that engage corresponding annular arcuate surfaces of rollers to guide the pedals in a horizontal, linear manner. Unidirectional drive sprockets engage the drive chain and are mounted on each pedal, with one of the unidirectional sprockets being mounted on an extension to provide clearance for alternating pedal motion. The frame includes a midsection having a single-tube construction to provide a low rider seating position. The steering system includes a handle bar extending under the seated rider that is operably connected to the front yoke by an elongate member that extends below the midsection of the bicycle frame.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
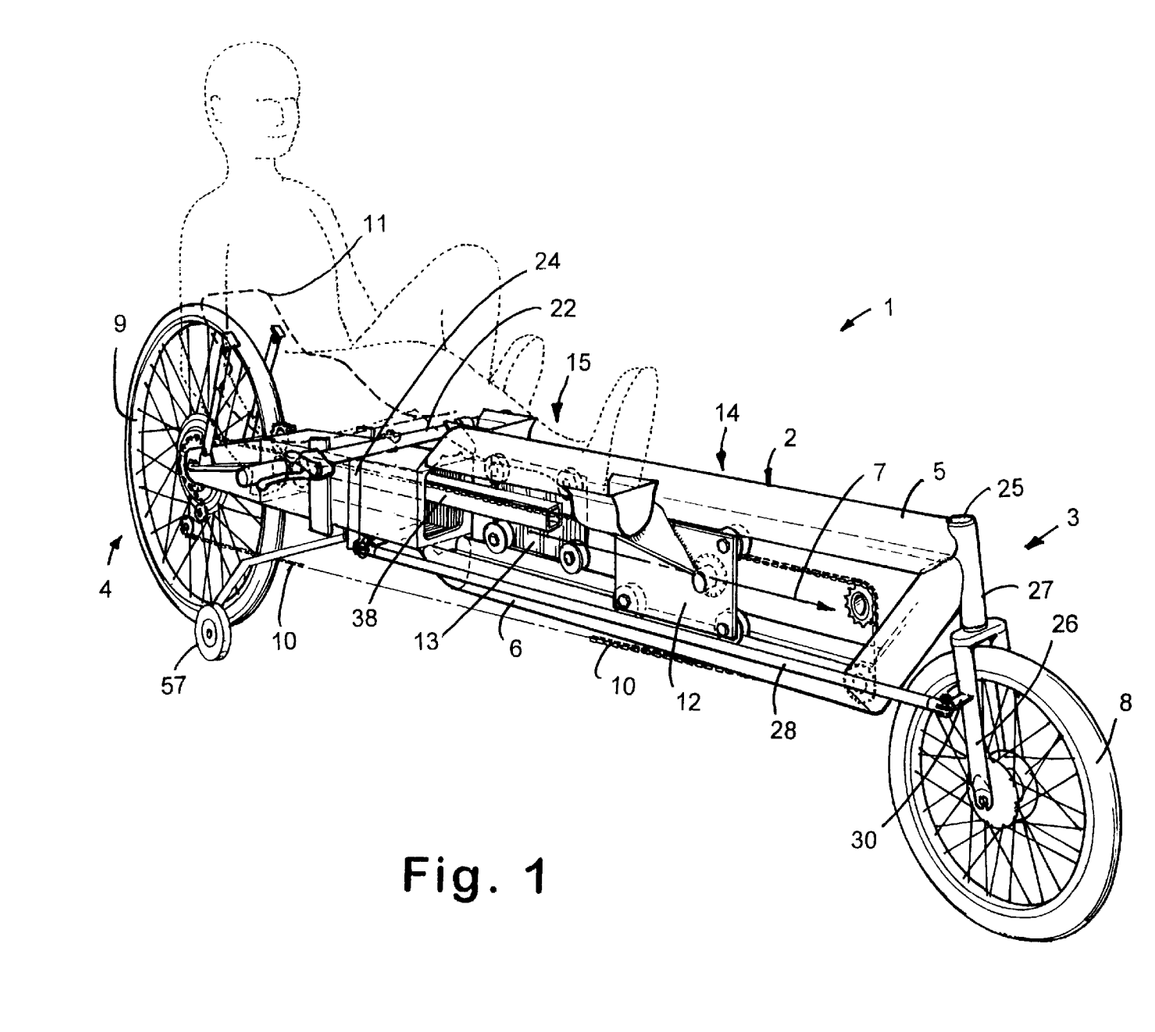
FIG. 1 is a perspective view of a bicycle embodying the present invention, comprising a linearly actuated pedal drive system that is guided by structural frame members.
Figure 2:
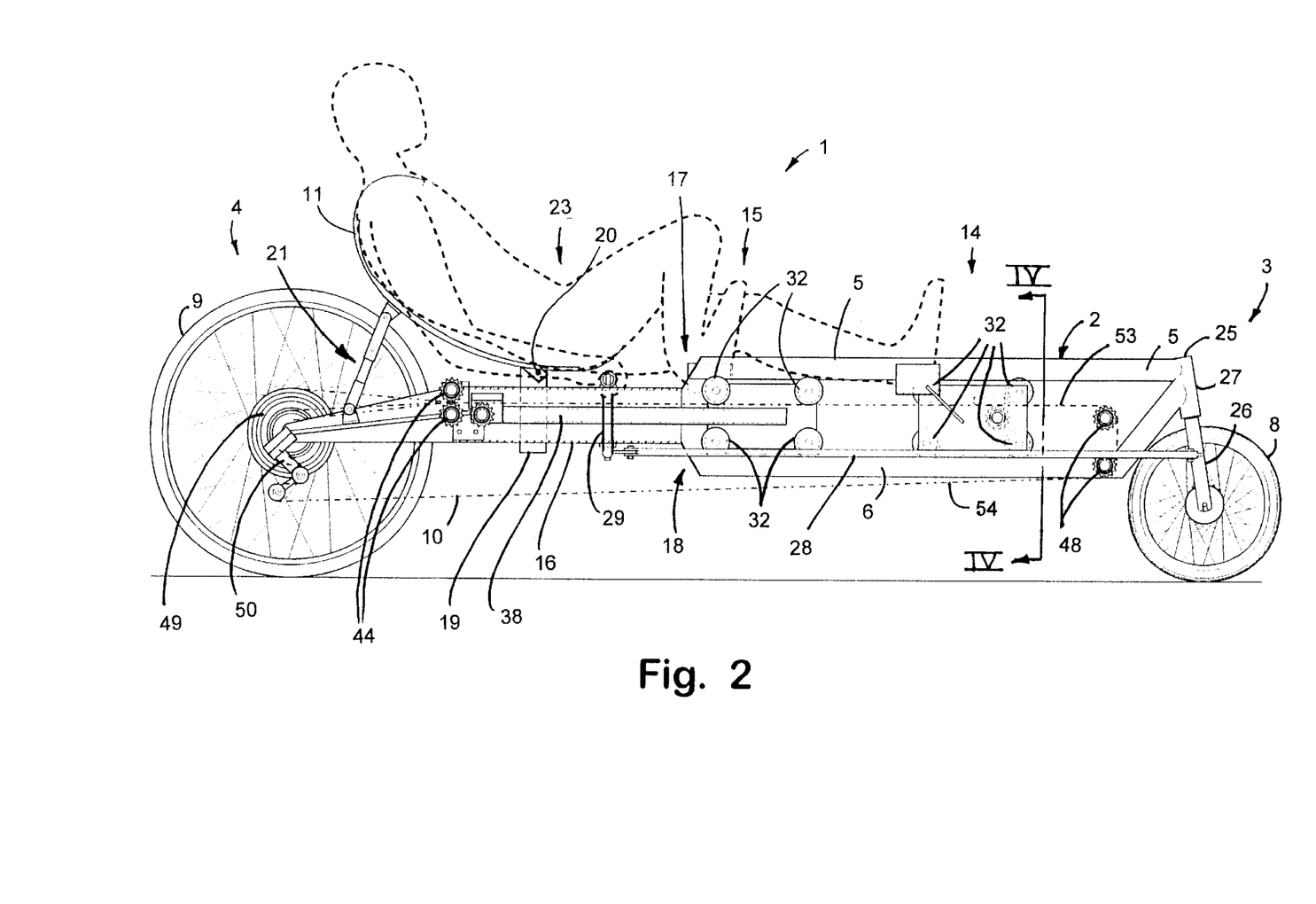
FIG. 2 is a side elevational view of the bicycle.

For purposes of description herein, the terms "upper," "lower," "right," "left," "rear," "front," "vertical," "horizontal," and derivatives thereof shall relate to the invention as oriented in FIGS. 1 and 2 relative to a seated user. However, it is to be understood that the invention may assume various alternative orientations and step sequences, except where expressly specified to the contrary. It is also to be understood that specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIGS. 1–3) generally designates a wheeled, manually-driven rideable apparatus such as the bicycle 1 embodying the present invention. In the illustrated example, bicycle 1 includes a frame 2 having front and rear sections 3, 4 with a pair of guides 5, 6 disposed in a parallel relationship. Each of the guides 5, 6 carries a portion of the load generated by a seated rider. The guides 5, 6 define therebetween a pedal drive path 7 that extends parallel to the guides 5, 6. A front wheel 8 is rotatably mounted to the frame 2 adjacent the front section 3. A rear wheel 9 is rotatably mounted to the frame 2 adjacent the rear section 4. A drive mechanism is connected to the frame and includes an elongate flexible member such as drive chain 10 forming a loop. A seat 11 is mounted to the frame and supports a rider. A pair of pedals 12, 13 are operably attached to the rear wheel 9 by the drive chain 10 for powered rotation of the rear wheel 9. The pedals 12, 13 are slidably supported and guided between the guides 5, 6 for reciprocating motion along the pedal drive path 7 between an extended position 14 and a retracted position 15.

Figure 3:
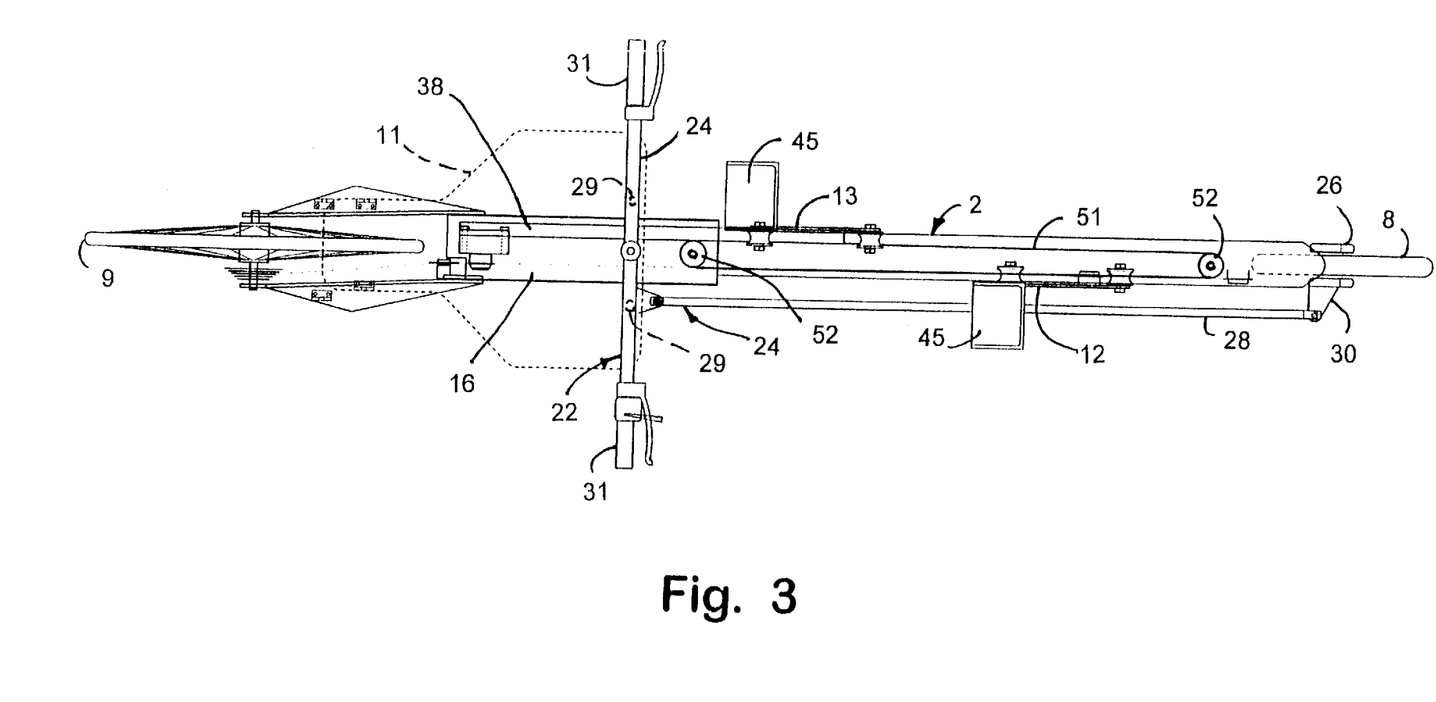
FIG. 3 is a top plan view of the bicycle.

With reference to FIGS. 1-3, in the illustrated example, the bicycle frame 2 includes a large tubular structural extension 16 that is welded to the rearward ends 17, 18 of the guides 5, 6. The structural extension 16 forms the midsection 23 of the frame 2, and is preferably formed of extruded aluminum. The structural extension 16 has a relatively large rectangular cross-sectional shape to receive the drive extension 38 when the second pedal 13 is in a fully retracted or rearward position 15. A bracket 19 is attached to the structural extension 16 for support of the seat 11. An extendable support 21 rotates the seat 11 about a pivot 20 to adjust the angle of the seat 11. The use of the single tubular extension 16 for the midsection 23 of the frame 2 allows the seat 11 to be mounted in a relatively low position, thereby providing a low center of gravity and reduced frontal area for lower aerodynamic drag.

With reference to FIGS. 1-4, front bearing 25 is mounted in an upright tube 27 that forms a portion of the front section 3 of the frame 2. A steerable front fork 26 is rotatably journaled to the front bearing 25 to allow the operator to steer the bicycle during operation. The steering mechanism includes a longitudinal section 28 that is connected to the front fork 26 by a crank 30 (FIG. 3). The longitudinal section 28 extends under the midsection 23 of the frame, and is operably attached to the handle bar 22. The handle bar 22 is rotatably mounted to the structural extension 16, and includes a pair of vertical sections 29 that extend around the outside of the structural extension 16. The handle bar 22 includes a horizontal upper section 24 with handles 31 at each end thereof. Alternatively, if desired, the horizontal section 24 may have upwardly extending end sections forming the handles 31 to provide a higher hand position.

Figure 4:
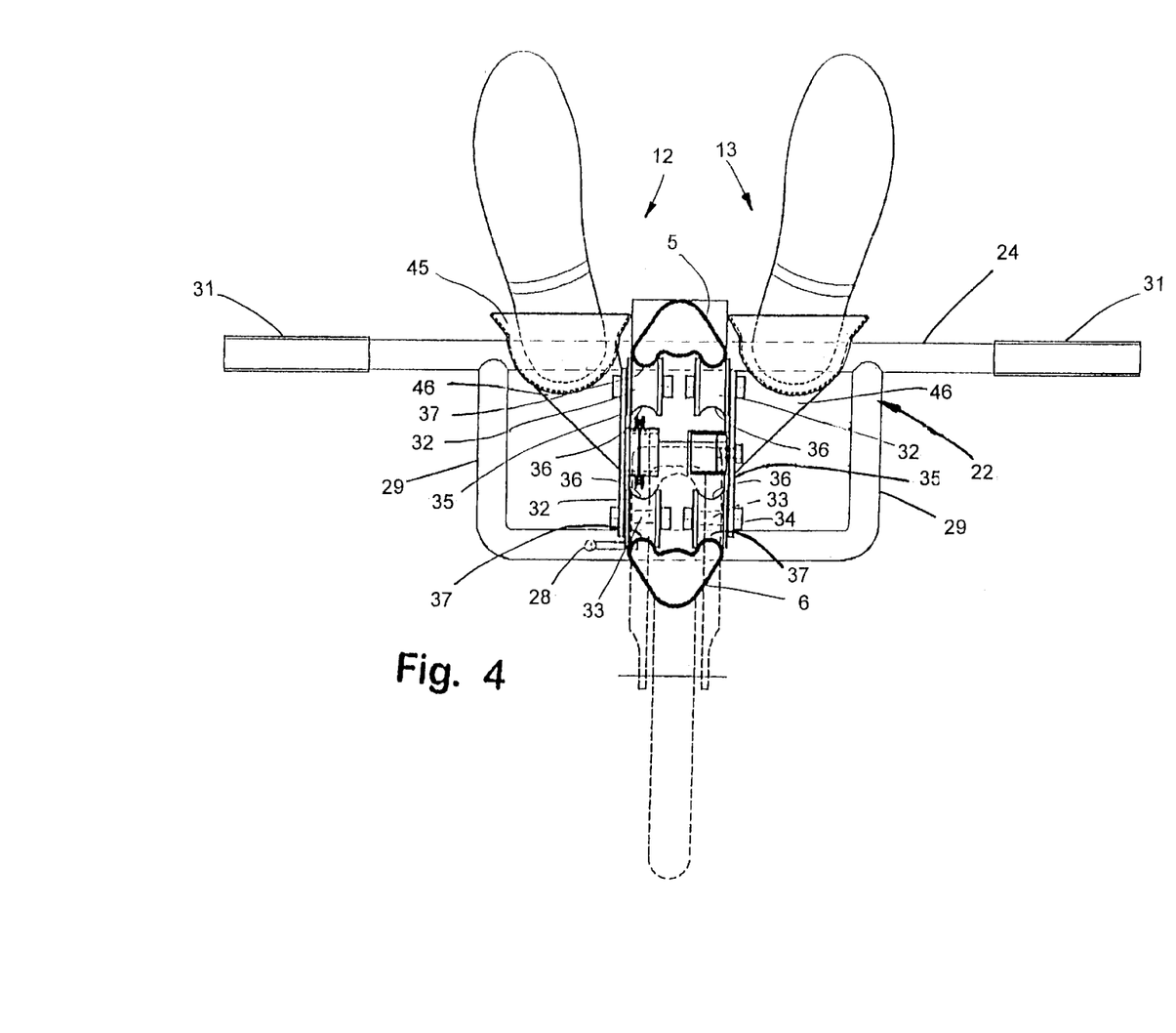
FIG. 4 is a fragmentary, cross-sectional view of the frame and pedals, taken along the line IV—IV, FIG. 2.

With reference to FIGS. 1-6, the rectilinear pedal drive system of the present bicycle 1 includes first and second pedals 12, 13 which are slidably supported and guided between a pair of guides 5, 6 which are elongate structural frame members, each of which carries a portion of the load generated by a seated rider. Each pedal 12, 13 includes four rollers 32 having ball bearings 33 that are rotatably mounted to a vertical plate 35 by fasteners such as bolts 34. Each pedal has two rollers 32 mounted adjacent an upper edge of the plate 35 to engage the upper guide 5, and two rollers 32 mounted adjacent the lower edge of the plate 35 to engage the lower guide 6. As best seen in FIG. 4, each roller 32 has an annular, concave outer surface 36 forming a groove which is preferably an arcuate shape. Each guide 5, 6 includes a pair of parallel guide portions such as protrusions 37 having a shape corresponding to the annular grooved surface 36 of the rollers. Preferably, the guide portions 37 are raised protrusions, with an arcuate shape corresponding to the arcuate annular outer grooved surface 36 of the rollers 32. Alternatively, the outer surface 36 of the rollers could have a V-shape or other protruding convex shape, with the guides or structural members 5, 6 having a corresponding channel or groove that forms the guide portions 37.

Each guide 5, 6 is formed from extruded aluminum and is symmetrical about a vertical plane with a generally triangular shape. When in an assembled condition, the guides 5, 6 are preferably arranged in a parallel, spaced-apart relationship with the first, or upper guide 5 directly above the second, or lower guide 6. Each guide portion 37 of the upper guide 5 is located directly above a corresponding guide portion 37 of the lower guide 6. The guides 5, 6 are structural frame members that carry a portion of the load generated by a seated rider, even when the rider is not applying force to the pedals.

Figures 5, 6:
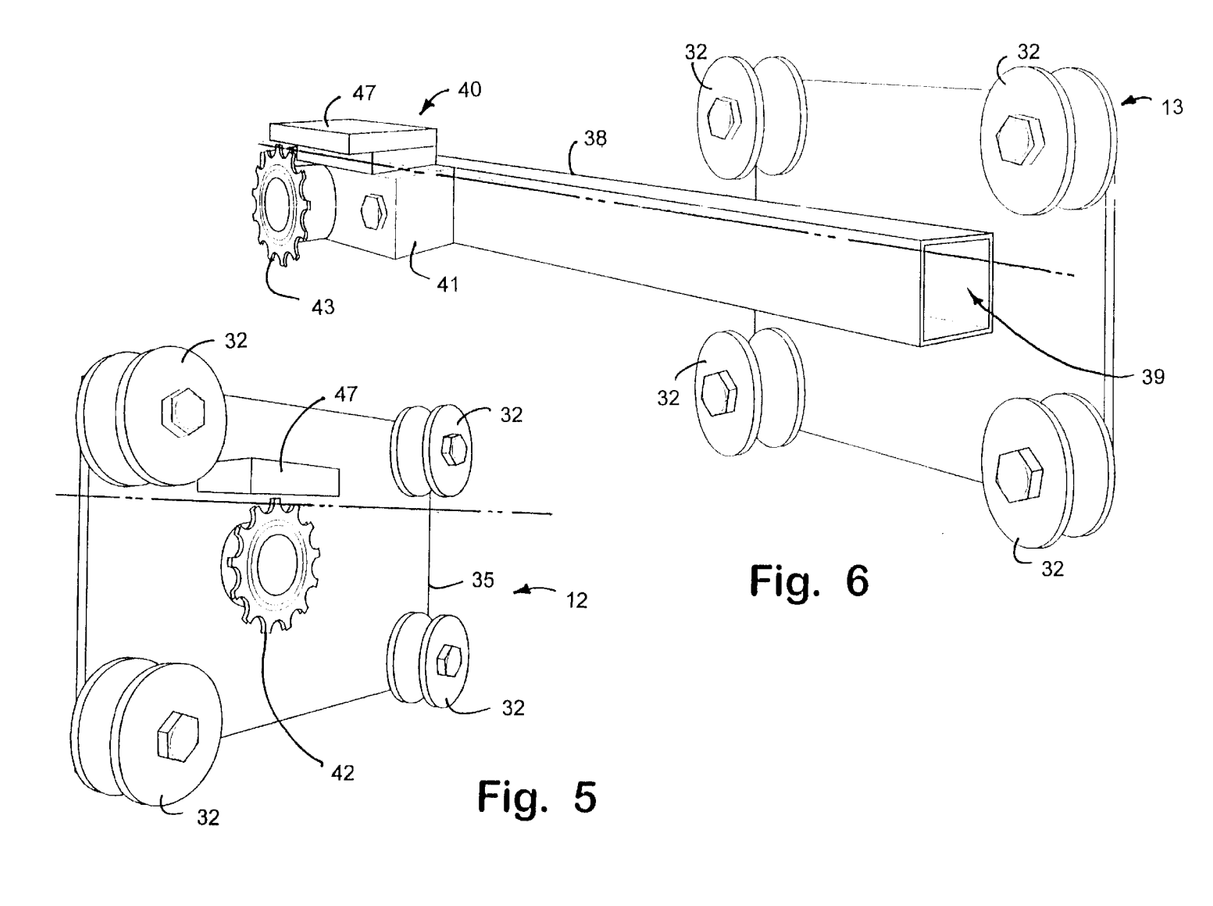
FIG. 5 is a perspective view of the right pedal.
FIG. 6 is a perspective view of the left pedal, showing the drive extension.

With reference to FIG. 5, the first pedal 12 includes a vertical plate 35 and four rollers 32. A first unidirectional drive sprocket 42 is rotatably mounted to the plate 35, and transmits force to the drive chain 10 only during forward motion of the pedal 12. A chain guide 47 ensures that the drive chain 10 maintains engagement with the first unidirectional drive sprocket 42.

With reference to FIG. 6, the second pedal 13 is similar to the first pedal, but further includes an elongate drive extension 38 having a first or forward end 39 that is rigidly attached to the plate 35. A sprocket support plate 41 is fixed to the second end 40 of the drive extension 38. A second unidirectional drive sprocket 43 is rotatably mounted to the sprocket support plate 41. The second unidirectional drive sprocket 43 transmits the force generated by a rider's foot to the drive chain 10 only during forward motion of the pedal, allowing the pedal to translate rearwardly without substantial friction from the drive chain 10. Idler sprockets 44 are mounted to the rear portion 4 of the frame 2 (FIG. 2) and, in conjunction with the chain guide 47, ensure that the drive chain 10 maintains engagement with the drive sprocket 43. Each pedal 12, 13 also includes a foot support 45 which is attached to the plate 35 by a bracket 46 (FIG. 4).

The drive chain 10 forms a single, elongate loop with an upper horizontal portion 53 and a lower horizontal portion 54. A pair of idler sprockets 48 support the drive chain 10 at the forward end, and another pair of idler sprockets 44 support the guide chain 10 near the rearward end thereof (FIG. 2). The rearward end of the drive chain 10 is operably connected to the rear wheel 9 by drive sprockets 49. The drive sprockets 49 are similar to those used with a "front freewheel" bicycle drive system and do not include a unidirectional clutch. This causes continuous chain movement if the bicycle is rolling, even if the pedals are stationary. This system eliminates the need to initiate chain movement after stopping the pedals, and also allows the speeds to be shifted while coasting. The speeds are shifted by a conventional derailleur 50. Both the first and second unidirectional drive sprockets 42, 43 act on the upper portion of the loop formed by the drive chain 10. The first unidirectional drive sprocket 42 on the first pedal 12 always acts on the upper portion 53 of the drive chain 10 in front of the second unidirectional drive sprocket 43. The drive extension 38 provides clearance between the drive sprockets 42, 43 when the first pedal 12 is in the rearward or fully retracted position 15, and the second pedal 13 is in the forward or fully extended position 14. This arrangement allows alternating pedal motion while requiring only a single drive chain. This arrangement also allows side-by-side, simultaneous pedal motion if a rider desires.

If desired, a cable 51 and a pair of pulleys 52 may be provided to force the pedals into an alternating operating motion (FIG. 3). The cable 51 is attached to the first and second pedals 12, 13 such that forces are transmitted between the pedals, thereby producing an alternating pedal motion.

Retractable stabilizer wheels 57 may be mounted to the structural extension 16. The stabilizer wheels are rotated downward by the rider to prevent tipping of the bicycle when stopped or during slow speed operation, and are retracted once a stable, higher speed is attained.

During operation, the rider can operate the pedals in either an alternating manner, or, alternatively, the pedals may be pushed forward and brought rearward at the same time in a side-by-side manner. In addition, the bicycle may be operated by a person having limited use of one leg by simply leaving one of the pedals in place while using the other pedal to power the bicycle.

The present bicycle 1 utilizes a single, continuous motion drive chain with a simple configuration that does not require extensive gearing or other complicated drive mechanisms. The structural members of the frame not only guide and support the pedals, but also provide structural support for operation, thereby reducing the weight and complexity that results from having separate, non-structural pedal guides. The single tube construction of the frame midsection allows a low rider position with a reduced frontal area and low center of gravity.

In the foregoing description, it will readily appreciated by those skilled in the art that modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A bicycle comprising:
   a frame having a front section and a rear section, said frame including a pair of horizontal guides disposed in a vertically spaced-apart parallel relationship, each of said guides forming structural frame members carrying a portion of the load generated by a seated rider, and defining therebetween a pedal drive path extending parallel to said guides;
   a rear wheel rotatably mounted to said frame adjacent said rear section;
   a seat for supporting a rider mounted to said frame;
   an elongate flexible member forming a loop;
   a drive mechanism connected to said frame and including a pair of pedals operably attached to said rear wheel by said elongate flexible member for powered rotation of said rear wheel, said pedals being slidably supported and guided between said guides for motion along said pedal drive path between an extended position and a retracted position.

2. A bicycle as set forth in claim 1, wherein:
   said pedals each include first, second and third rollers rotatably mounted to said pedals to slidably support and guide said pedals between said guides along said pedal drive path.

3. A bicycle as set forth in claim 2, wherein:
   said guides are horizontally oriented and have a forward end and a rearward end.

4. A bicycle as set forth in claim 3, wherein:
   said guides are substantially linear.

5. A bicycle as set forth in claim 2, wherein:
   said guides are tubular structural members with cross sections that include first and second guide portions extending along substantially the entire length of said guides, said first and second guide portions corresponding to and engaging said first, second and third rollers to securely guide said pedals along said pedal drive path.

6. A bicycle as set forth in claim 5, wherein:
   said guide portions are convex; and
   said rollers define a corresponding annular concave shape.

7. A bicycle as set forth in claim 6, wherein:
   said guides are extruded, and said guide portions are formed by a portion of said tube walls.

8. A bicycle as set forth in claim 1, wherein said frame includes a midsection and said front section of said frame includes a front bearing, and wherein said bicycle further comprises:
   a steerable front fork journaled to said front bearing;
   a front wheel operably supported by said front fork; and
   a steering mechanism connected to said fork, said steering mechanism having a horizontal section that extends under said midsection from said front fork to said midsection, and having a pair of vertical sections operably attached to said horizontal section, said vertical sections extending from under said midsection to a location generally above said midsection, and further having handles extending from an upper end of each of said vertical sections so that a seated person can readily grasp said handles and steer said bicycle.

9. A bicycle comprising:
   a frame having a front section and a rear section, said frame including a pair of guides disposed in a parallel relationship, each of said guides carrying a portion of the load generated by a seated rider, and defining therebetween a pedal drive path extending parallel to said guides;

a rear wheel rotatably mounted to said frame adjacent said rear section;

a seat for supporting a rider mounted to said frame;

an elongate flexible member forming a loop;

a drive mechanism connected to said frame and including a pair of pedals operably attached to said rear wheel by said elongate flexible member for powered rotation of said rear wheel, said pedals being slidably supported and guided between said guides for motion along said pedal drive path between an extended position and a retracted position;

said pedals each include first, second and third rollers rotatably mounted to said pedals to slidably support and guide said pedals between said guides along said pedal drive path;

said guides are tubular structural members with cross sections that include first and second guide portions extending along substantially the entire length of said guides, said first and second guide portions corresponding to and engaging said first, second and third rollers to securely guide said pedals along said pedal drive path;

said elongate flexible member is a drive chain, said loop formed by said chain having a horizontally extending upper portion;

one of said pedals includes a first unidirectional drive sprocket engaging said drive chain to transmit forces generated by a foot of a rider to said drive chain; and the other of said pedals includes an elongate drive extension having a second unidirectional drive sprocket mounted thereto adjacent an end to transmit forces generated by a foot of a rider to said drive chain, said extension providing clearance to allow said first and second unidirectional sprockets to engage said chain along said horizontally extending upper portion during alternating pedal motion.

10. A bicycle as set forth in claim 9 wherein:

said frame includes a horizontally extending structural extension with a tubular cross section and a forward end and a rearward end;

said seat is mounted above said structural extension and is adapted to comfortably support a rider in a reclining operating position; and the rearward ends of each of said guides are rigidly fixed to said forward end of said structural extension, a portion of said drive chain extending through said structural extension and a portion of said drive extension extending into said structural extension when said second pedal is in said retracted position.

11. A bicycle comprising:

a frame having a front section and a rear section, said frame including a pair of guides disposed in a parallel relationship, each of said guides carrying a portion of the load generated by a seated rider, and defining therebetween a pedal drive path extending parallel to said guides;

a rear wheel rotatably mounted to said frame adjacent said rear section;

a seat for supporting a rider mounted to said frame;

an elongate flexible member forming a loop;

a drive mechanism connected to said frame and including a pair of pedals operably attached to said rear wheel by said elongate flexible member for powered rotation of said rear wheel, said pedals being slidably supported and guided between said guides for motion along said pedal drive path between an extended position and a retracted position;

said pedals each include first, second and third rollers rotatably mounted to said pedals to slidably support and guide said pedals between said guides along said pedal drive path, said guides are tubular structural members with cross sections that include first and second guide portions extending along substantially the entire length of said guides, said first and second guide portions corresponding to and engaging said first, second and third rollers to securely guide said pedals along said pedal drive path;

said guide portions are raised;

said rollers define a corresponding annular concave shape, said guides are extruded, and said guide portions are formed by a portion of said tube walls;

said cross section includes first, second and third wall sections defining a generally triangular shape with said guide portions formed on a first wall section of said triangle at adjacent corners thereof, said guide portions having an arcuate shape, said first wall sections of said structural members facing each other in a spaced-apart, parallel relationship.

12. A bicycle as set forth in claim 11, wherein:

said pedals each include a fourth roller, and wherein said first, second, third and fourth rollers are co-planar, and the axis of rotation of each roller is horizontally oriented.

13. A bicycle as set forth in claim 12, wherein:

said guides are symmetrical about a vertical plane, and wherein said first, second, third and fourth rollers of one pedal define a second vertical plane, and wherein said first, second, third and fourth rollers of the other pedal define a third vertical plane, said second and third planes being parallel to said first vertical plane.

14. A bicycle comprising:

a frame having a front section and a rear section, said frame including a pair of guides disposed in a parallel relationship, each of said guides carrying a portion of the load generated by a seated rider, and defining therebetween a pedal drive path extending parallel to said guides;

a rear wheel rotatably mounted to said frame adjacent said rear section;

a seat for supporting a rider mounted to said frame;

an elongate flexible member forming a loop;

a drive mechanism connected to said frame and including a pair of pedals operably attached to said rear wheel by said elongate flexible member for powered rotation of said rear wheel, said pedals being slidably supported and guided between said guides for motion along said pedal drive path between an extended position and a retracted position;

said elongate flexible member is a drive chain, said loop formed by said chain having a horizontally extending upper portion;

one of said pedals includes a first unidirectional drive sprocket engaging said drive chain to transmit forces generated by a foot of a rider to said drive chain;

the other of said pedals includes an elongate drive extension with a forward and a rearward end and having a second unidirectional drive sprocket mounted thereto adjacent said rearward end to transmit forces generated by a foot of a rider to said drive chain, said extension providing clearance to allow said first and second unidirectional sprockets to engage said chain along said horizontally extending upper portion during alternating pedal motion.

15. A bicycle comprising:

a frame comprising structural frame members, each of which carries a portion of the load generated by a rider during operation, said frame defining a front section and a rear section;

a front wheel rotatably operably mounted to said frame adjacent said front section;

a rear wheel rotatably mounted to said frame adjacent said rear section;

a seat mounted to said frame, said seat being adapted to comfortably support a rider in a recumbent riding position;

a drive chain forming an elongated loop;

a horizontal guide attached to said frame; and a pair of pedals operably connected to said drive chain, said pedals being slidably supported on said guide for horizontal motion therealong, one of said pedals including a first unidirectional drive sprocket mounted thereon and engaging said drive chain, the other of said pedals including an elongate drive extension having a forward end and a rearward end including a second unidirectional drive sprocket mounted adjacent said rearward end of said drive extension, said drive extension having sufficient length to provide clearance between said first and second unidirectional drive sprockets during alternating pedal motion.

16. A bicycle as set forth in claim 15, wherein:

said guide is a structural frame member.

17. A bicycle as set forth in claim 16, wherein:

said pedals include rollers to slidably support said pedals on said horizontal guide.

18. A bicycle as set forth in claim 15, wherein:

said guide comprises a pair of substantially linear horizontal structural members in a parallel, spaced-apart relationship defining a pedal drive path therebetween, said pedals being slidably supported for alternating horizontal motion along said pedal drive path.

19. A bicycle comprising:

a frame comprising structural frame members, each of which carries a portion of the load generated by a rider during operation, said frame defining a front section and a rear section;

a front wheel rotatably operably mounted to said frame adjacent said front section;

a rear wheel rotatably mounted to said frame adjacent said rear section;

a seat mounted to said frame, said seat being adapted to comfortably support a rider in a recumbent riding position;

a drive chain forming an elongated loop;

a horizontal guide attached to said frame;

a pair of pedals operably connected to said drive chain, said pedals being slidably supported on said guide for horizontal motion therealong, one of said pedals including a first unidirectional drive sprocket mounted thereon and engaging said drive chain, the other of said pedals including an elongate drive extension having a forward end and a rearward end including a second unidirectional drive sprocket mounted adjacent said rearward end of said drive extension, said drive extension having sufficient length to provide clearance between said first and second unidirectional drive sprockets during alternating pedal motion;

said guide comprises a pair of substantially linear horizontal structural members in a parallel, spaced-apart relationship defining a pedal drive path therebetween, said pedals being slidably supported for alternating horizontal motion along said pedal drive path;

one of said guides is positioned directly above the other of said guides;

said pedals each include first, second, third and fourth rollers, each of said rollers having an annular groove with a shape corresponding to said protrusions, and said first structural member includes a pair of elongate parallel upper protrusions extending therealong;

said pedals being supported between said structural members by corresponding upper and lower protrusions in a side-by-side relationship by said rollers, said pedals each having two of said rollers engaging an upper protrusion and two of said rollers engaging a lower protrusion to thereby support and guide said pedals in a side-by-side relationship for reciprocating linear horizontal motion along said pedal drive path.

20. A wheeled manually driven rideable apparatus comprising:

a frame defining a pair of horizontally extending guides;

a pair of pedals operably mounted in the guides for reciprocating movement;

a seat on said frame constructed to position a seated person in a position on said frame with the person's legs extending generally horizontally when the person's feet are engaging said pedals;

front and rear wheels operably mounted on the frame; and a drive mechanism operably connecting the pedals to one of said front and rear wheels, the drive mechanism including a one-way moving drive chain and a unidirectional sprocket connecting each pedal independently to the drive chain so that said pedals can selectively be operated one at a time in an alternating pattern, or one at a time while holding the other pedal still, or simultaneously in a side-by-side manner.

21. A wheeled riding device comprising:

a low profile wheeled frame having a front section with a front bearing, a midsection constructed to support a seated person, and a rear section, said midsection including a large horizontal tube;

at least one rear wheel operably supported by said rear section;

a steerable front fork journaled to said front bearing;

a front wheel operably supported by said front fork; and a steering mechanism connected to said fork, said steering mechanism having a lower horizontal section that extends under said midsection from said front fork to said midsection, and an upper horizontal section that extends over said midsection, and having a pair of vertical sections operably attached to said upper and lower horizontal sections and defining an enlarged opening, said midsection disposed within said enlarged opening, said vertical sections extending from under said midsection to a location generally above said midsection, and further having handles extending from an upper end of each of said vertical sections so that a seated person can readily grasp said handles and steer said riding device.

22. A wheeled riding device as set forth in claim 21, wherein:

said frame defines a pair of horizontally extending guides;

said riding device further comprising:

a pair of pedals operably mounted to the guides for reciprocating movement;

a drive mechanism operably connecting the pedals to the rear wheel, the drive mechanism including a one-way moving drive chain and unidirectional sprockets connecting the pedals independently to the drive chain so that the pedals can selectively be operated one at a time in an alternating pattern, or one at a time while holding the other pedal still, or simultaneously in a side-by-side manner.

23. A bicycle comprising:

a frame comprising structural frame members, each of which carries a portion of the load generated by a rider during operation, said frame defining a front section and a rear section;

a front wheel rotatably operably mounted to said frame adjacent said front section;

a rear wheel rotatably mounted to said frame adjacent said rear section;

a seat mounted to said frame, said seat being adapted to comfortably support a rider in a recumbent riding position;

a drive chain forming an elongated loop;

a horizontal guide attached to said frame; and a pair of pedals operably connected to said drive chain, said pedals being slidably supported on said guide for horizontal motion therealong, one of said pedals including a first unidirectional drive sprocket mounted thereon and engaging said drive chain, the other of said pedals including an elongate drive extension having a first end connected to said other pedal, an opposite end of said elongate drive extension having a second unidirectional drive sprocket mounted adjacent said opposite end of said drive extension, said drive extension having sufficient length to provide clearance between said first and second unidirectional drive sprockets during alternating pedal motion.

\* \* \* \* \*